(12) United States Patent
Destain

(10) Patent No.: US 7,369,320 B2
(45) Date of Patent: May 6, 2008

(54) PROJECTION SYSTEM WITH BEAM HOMOGENIZER

(75) Inventor: Patrick R. Destain, Loveland, OH (US)

(73) Assignee: 3M Innovative Properties Company, Saint Paul, MN (US)

( * ) Notice: Subject to any disclaimer, the term of this patent is extended or adjusted under 35 U.S.C. 154(b) by 296 days.

(21) Appl. No.: 11/322,958

(22) Filed: Dec. 30, 2005

(65) Prior Publication Data
US 2007/0153397 A1 Jul. 5, 2007

(51) Int. Cl.
G02B 9/00 (2006.01)

(52) U.S. Cl. ............ 359/649; 359/641; 359/242

(58) Field of Classification Search .......... 359/649, 359/677, 651, 242, 238, 245; 353/74, 76, 353/77, 78
See application file for complete search history.

(56) References Cited

U.S. PATENT DOCUMENTS

| | | | |
|---|---|---|---|
| 4,519,694 A | 5/1985 | Kashiwagi et al. | |
| 5,084,807 A | 1/1992 | McKechnie et al. | |
| 5,355,187 A | 10/1994 | Ogino et al. | |
| 5,438,379 A | 8/1995 | Kurematsu | |
| 5,537,171 A | 7/1996 | Ogino et al. | |
| 5,868,481 A | 2/1999 | Conner et al. | |
| 5,882,774 A | 3/1999 | Jonza et al. | |
| 5,940,152 A | 8/1999 | Wilson et al. | |
| 6,038,064 A | 3/2000 | Kanao et al. | |
| 6,335,838 B1 | 1/2002 | Kasai et al. | |
| RE37,578 E | 3/2002 | Gleckman | |
| 6,592,224 B2 | 7/2003 | Ito et al. | |
| 6,595,648 B1 | 7/2003 | Woodgate et al. | |
| 6,639,733 B2 | 10/2003 | Minano et al. | |
| 6,816,234 B2 | 11/2004 | Tsuji | |
| 6,868,223 B2 | 3/2005 | Shinoda | |
| 6,916,440 B2 | 7/2005 | Jackson et al. | |
| 6,936,209 B2 | 8/2005 | Jackson et al. | |
| 6,939,499 B2 | 9/2005 | Merrill et al. | |
| 6,949,212 B2 | 9/2005 | Merrill et al. | |
| 6,961,115 B2 | 11/2005 | Hamatani et al. | |
| 7,046,338 B2 | 5/2006 | McGuire | |
| 2004/0080938 A1 | 4/2004 | Holman et al. | |
| 2005/0036119 A1 | 2/2005 | Ruda et al. | |

OTHER PUBLICATIONS

Born, Max and Emil Wolf, *Principles of Optics; Electromagnetic Theory of Propagation, Interference and Diffraction of Light*, Table of Contents, pp. 522-526, Sixth Edition, Pergamon Press, Oxford, 1980.

(Continued)

Primary Examiner—Timothy J. Thompson (57) ABSTRACT

A projection system having a prescribed relationship between the condenser and the projection lens is disclosed, where an imager gate normally coinciding with a projection object plane is between and spaced away from a condenser back focal plane and a condenser image plane. The condenser images an extended source onto the condenser image plane. A pixilated panel or film defining a graphic image is located at the imager gate. The magnification of the condenser is chosen so the image of the source is essentially the same size as the pixilated panel. Positioning the imager gate away from the condenser image plane provides blurring of any brightness non-uniformities across the area of the source, providing a relatively uniform illumination pattern whose outer shape matches the shape of the imager gate.

22 Claims, 2 Drawing Sheets

OTHER PUBLICATIONS

Sterrenburg, Frithjof A.S., Microscopy Primer, Chapter 7, http://www.microscopy-uk.org.uk/index.html?http://www/microscopy-uk.org.uk/primer/illumin.htm.

Abbe Illumination Definition, The Photonics Directory, www.photonics.com.

Bruzzone et al., "High-Performance LCoS Optical Engine Using Catesian Polarizer Technology", SID Symposium Digest vol. 34, pp. 126-129, Issue 1, May 2003.

Keuper et al., "RGB LED Illuminator for Pocket-Sized Projectors", SID Symposium Digest of Technical Papers, pp. 943-945, vol. 35, Issue 1, May 2004.

Kingslake, Rudolf, "Applied Optics and Optical Engineering", Table of Contents, pp. 223-226, vol. 2, Academic Press, New York, 1965.

Koehler Illumination Definition, The Photonics Directory, www.photonics.com.

Light Prescriptions Innovators, "Technology Review", www.lpi-llc.com.

Spindler & Hoyer, "Generating Parallel Beams", p. 25, Precision Optics, 1990.

U.S. Application entitled "Method for Making Polarizing Beam Splitters", filed on Jul. 29, 2005, Having U.S. Appl. No. 11/192,681.

U.S. Application entitled "LED with Compound Encapsulant Lens", filed on Dec. 30, 2005, having U.S. Appl. No. 11/322,801.

U.S. Application entitled "Fresnel Lens Combination", filed on Dec. 30, 2005, having U.S. Appl. No. 11/322,981.

U.S. Application entitled "Polarizing Beam Splitter", filed on Jul. 29, 2005, having U.S. Appl. No. 11/192,655.

PROJECTION SYSTEM WITH BEAM HOMOGENIZER

FIELD OF THE INVENTION

The present invention is directed to illumination for projection systems.

BACKGROUND

In a projection system, it is desirable to provide nearly uniform illumination for a rectangular pixilated panel without wasting light. In Kohler illumination, in which a rectangular portion is used from the center of a generally round uniform beam, a substantial amount of light is wasted. In Abbe illumination, any non-uniformities present in the source are also present in the image. If additional homogenizer components are introduced into the optical path, such as diffusers, lens arrays, or tunnel-shaped light guides, they may detrimentally impact the size, complexity, expense, and/or efficiency of the projector.

BRIEF SUMMARY

The present application discloses, inter alia, projection systems that include a condenser and an imager gate. The condenser has a condenser object plane, a condenser image plane, and a condenser back focal plane. The imager gate is preferably disposed between and spaced away from the condenser back focal plane and the condenser image plane.

Also disclosed are methods of modulating a beam of light. Some of these methods include focusing a beam with a condenser onto an image plane of the condenser, and forming an image by spatially modulating the beam at an imager gate disposed between a condenser image plane and a condenser back focal plane. The forming step can include adjustably controlling polarization of individual portions of the beam at the imager gate.

Also disclosed are projection systems that include a condenser lens and a projection lens. The condenser lens has a condenser image plane and a condenser back focal plane. The projection lens has a projection object plane positioned between and spaced away from the condenser back focal plane and the condenser image plane.

Also disclosed are projection systems that include a source, a condenser, and a reflective liquid crystal panel. The condenser, which has a condenser object plane, a condenser image plane, and a condenser back focal plane, forms an image of the source at the condenser image plane when the source is located at the condenser object plane. The reflective liquid crystal panel is disposed between and separated from the condenser back focal plane and the condenser image plane, and is preferably closer to the condenser image plane than to the condenser back focal plane. The source can be or include an array of light emitting diodes. The condenser can include at least one aplanatic lens, at least one Fresnel lens, and at least one relay lens, and the relay lens can if desired be formed on a face of a polarizing beam splitter.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

In the figures, like reference numerals designate like elements.

DETAILED DESCRIPTION OF ILLUSTRATIVE EMBODIMENTS

Projection systems are becoming increasingly common for television systems, conference rooms, and theaters, with an ongoing effort to make them smaller and less expensive.

In one type of projection system, light from a source is collected by a condenser and directed onto a pixilated panel, such as a liquid crystal on silicon (LCOS) panel. The light reflected from the pixilated panel is then imaged onto a distant screen by a projection lens. In this type of projection system, the pixilated panel is generally tiny, compared to the viewable image on the screen, and it is generally considered desirable to situate the source, the condenser, the pixilated panel, and the intervening optics (excluding the projection lens) in the smallest possible volume with the fewest number of components.

Figure 1:
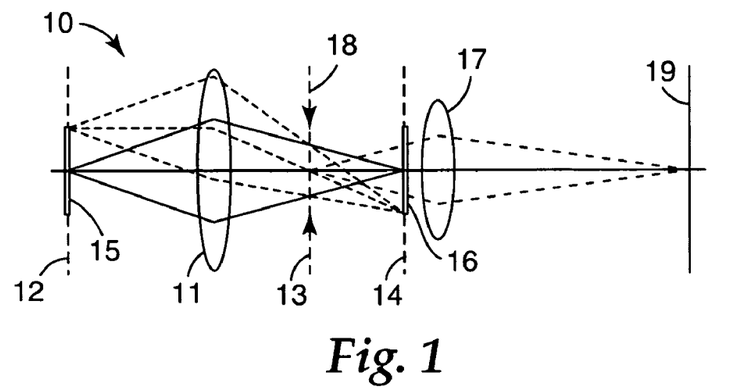
FIG. 1 is a schematic drawing of a Kohler illumination system.
Figure 2:
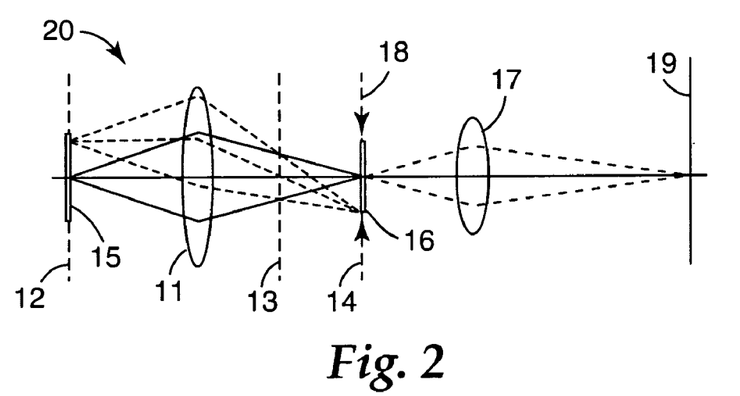
FIG. 2 is a schematic drawing of an Abbe illumination system.

The relationship between the condenser and the projection lens affects the performance of the projection system. FIGS. 1 and 2 illustrate two such relationships, commonly known as Kohler illumination and Abbe illumination, respectively. These two relationships have drawbacks when used in a projection system, which are detailed below. Note that FIGS. 1 and 2 are drawn in transmission; one of ordinary skill in the art may readily adapt any of the elements in these systems for use in transmission, reflection, or a combination of the two.

FIGS. 1 and 2 have several elements in common, and it instructive to describe these in general terms before differentiating between Kohler illumination and Abbe illumination. In both drawings, there is a condenser 11 and a projection lens 17. To assist the reader, the elements associated with the condenser (numbered 111 through 16) are labeled at the bottom of FIGS. 1 and 2. In contrast, the elements associated with the projection lens (elements 17-19) are labeled at the top of those figures. As discussed further below, optimal performance of the projection system can be achieved by appropriate positioning of the projection elements (17-19) with respect to the condenser elements (11-16).

Element 11 is a condenser. For ease of illustration it is drawn as a simple, single-element lens, but the reader will understand that it can be a combination of one or more refractive, reflective, and/or diffractive elements. For instance, the condenser 11 may include a compound lens in an aplanatic condition, meaning that the compound lens does not impart any spherical aberration to a transmitted beam. The condenser 11 may also include one or more microreplicated elements, such as a Fresnel lens. Fresnel lenses are generally thinner and lighter than their bulk-optic counterparts, which may be desirable. The condenser may also include one or more relay lenses, and one or more anamorphic elements (such as cylindrical surfaces) to provide the condenser with different amounts of magnification along orthogonal transverse axes.

Note that unlike the projection lens 17, which generally has a reduced amount of wavefront aberration, the condenser 11 may optionally have significant amounts of wavefront aberration, such as spherical aberration, coma, astigmatism, field curvature, distortion, and/or chromatic aberration. In general, wavefront errors in the condenser 11 may be present without degradation of the overall projection system performance.

The condenser 11, whether a single lens or a more complicated combination of refractive, reflective, and/or diffractive elements, has three axial locations associated with it, all denoted by dashed vertical lines in FIGS. 1 and 2. There is a condenser object plane 12 and a condenser image plane 14, situated so that an object placed at the condenser object plane 12 forms a paraxial image at the condenser image plane 14. Note that there may be optional wavefront aberrations in the condenser 11 that distort the actual condenser image so that it not need be truly planar; this does not affect the position of the condenser image plane 14, which is a paraxial quantity. There is also a condenser back focal plane 13.

The source 15 may be or include any suitable light source, such as a light emitting diode (LED), an array of LEDs, an arc lamp, a halogen lamp, a fluorescent lamp, one or more output facets of a laser diode, and others. Although point-sources may be used, the source 15 preferably has a finite spatial extent. This finite extent is shown schematically in FIGS. 1 and 2, in which rays emerging from the center of the source are drawn as solid, and rays emerging from the edge of the source 15 are shown as dotted. The solid and dotted bundles of rays are drawn as emerging with the same orientation and the same cone angle; this is a good approximation of many sources, where the emergent properties of the source are generally independent of spatial location on the source.

Taken together, elements 11-16 are associated with the condenser subsystem.

Elements 17-19 form the projection subsystem. An imager gate 18 houses the structure that is to be imaged, such as a pixilated panel or a piece of film. A projection lens 17 forms an image of the structure held in the imager gate 18 onto a screen 19.

The imager gate 18 is so named for historical reasons; for reel-to-reel motion picture projectors, the corresponding structure was known as a film gate. The film gate held the film as it spooled through the projector, and ensured that the axial location of the film was at the object plane of the projection lens, but was itself generally not imaged onto the screen. Analogously, the imager gate 18 is a frame, substrate, or other structure that holds the object of interest in position, such as a pixilated panel or a piece of film containing a graphic image to be viewed by an observer. The imager gate may have any suitable shape and size. For the case of an LCOS panel the spatial extent of the imager gate is the same as the spatial extent of the pixilated area on the LCOS panel, usually a substantially rectangular area centered on the optical axis and having an aspect ratio of 16:9 or 4:3, although rectangles with other aspect ratios and other non-circular shapes may also be used.

Note that the condenser images an extended source 15 onto the condenser image plane, and a pixilated panel or film defining a graphic image is located at the imager gate. The magnification of the condenser is chosen so the image of the source is essentially the same size as the pixilated panel. This is done in each of two perpendicular transverse directions. Thus, if the condenser has the same magnification along such transverse directions, the source preferably has a shape that is congruent to the shape of the imager gate, such as a rectangle with a 4:3 or 16:9 aspect ratio. However, if the condenser is anamorphic, having different magnifications along the perpendicular transverse directions (e.g. due to a cylindrical reflecting or refracting surface), then the source shape can have a different aspect ratio than that of the imager gate, as a function of the relative magnifications along the perpendicular transverse directions. Having one or more anamorphic elements in the condenser or elsewhere in the optical system may be useful for matching the size and shape of the source to that of the pixilated panel.

The projection lens 17 is also drawn as a simple, single-element lens, but may be a combination of one or more refractive, reflective, and/or diffractive elements. Most commonly, the projection lens 17 has multiple refractive elements and is generally well-corrected for wavefront aberrations. Like the condenser 11, the projection lens 17 has an associated projection object plane and projection image plane. During use, the imager gate 18 is located at the projection object plane, and the screen 19 is located at the projection image plane. Because the magnification of the projection lens 17 is usually quite large, bringing the image on the screen into focus may be accomplished by axially translating the projection lens 17 and leaving the imager gate 18 fixed. Alternatively, the imager gate 18 can translate, or both the projection lens 17 and the imager gate 18 can translate with respect to each other. The projection lens 17 may also have an optional zoom capability, which is generally implemented by axially translating one or more of the lens elements with respect to the others in a predetermined manner; this allows for a change in magnification without a significant change in focus. In general, the wavefront aberrations of the projection lens 17 are well-controlled over the entire focus and zoom ranges of the projector, so that the object held at the imager gate 18 is accurately reproduced on the screen 19.

The screen 19 may be a tangible screen, such as in a movie theater or conference room, for example, and may or may not be attached to the projector. Alternatively, the screen may be a virtual screen, such as in a headset display, at which a virtual image is formed at a prescribed location in space.

Taken together, elements 17-19 form the projection subsystem.

The relationship between the condenser and projection subsystems determines the performance of the illumination at the imager gate 18. More specifically, the axial location of the projection subsystem with respect to the condenser helps determine the illumination performance. It is usually desirable to make the illumination as uniform as possible over the entire extent of the imager gate 18, while wasting a minimal amount of light. These two constraints are often difficult to satisfy simultaneously, as will be described for the two illumination schemes shown in FIGS. 1 and 2.

FIG. 1 shows an optical system 10 that uses Kohler illumination. In Kohler illumination, the imager gate 18 is placed at the condenser back focal plane 13. Optionally, the image of the source 16 is made coincident with the entrance pupil of the projection lens (not shown).

One desirable feature of Kohler illumination is that the imager gate 18 receives essentially uniform illumination.

Each point on the film gate 18 receives light from essentially every location on the source 15. This can be seen schematically from the rays as shown in FIG. 1, in which the top, middle, and bottom of the imager gate 18 all receive light from both the center (solid) and the edge (dotted) of the source 15.

One undesirable feature of Kohler illumination is that the shape of the uniform illumination at the condenser back focal plane 13 is generally round. (This occurs because the cone of light emitted from each portion of the source is essentially circularly symmetric, and has little to do with the actual construction of the condenser 11 or the shape of the source 15 itself.) The pixilated panel, or other object located at the imager gate 18, is generally non-circular, usually rectangular with a 4:3 or 16:9 aspect ratio, such as for monitors or televisions. If we specify a central rectangular portion located within the round region of uniform illumination and use that rectangular portion for a rectangular imager gate 18, we overfill the imager gate and waste a significant amount of light power, which can be 40% or more in some systems.

FIG. 2 shows an optical system 20 that uses Abbe illumination, which is also known as critical illumination. In Abbe illumination, the imager gate 18 is placed at the image of the source 16 itself.

One desirable feature of Abbe illumination is that the usually rectangular imager gate 18 can be illuminated without wasting a significant amount of light by choosing an appropriately-shaped source 15. For instance, if the imager gate 18 is rectangular with a particular aspect ratio, then a rectangular source 15 with the same aspect ratio may be used to illuminate the imager gate 18 without overfilling it, provided that the magnification of the condenser 11 is chosen appropriately. The outer shape of the source 16 may be tailored to match that of the imager gate 18, which reduces the amount of wasted light power.

One undesirable feature of Abbe illumination is that any non-uniformities within the outer shape of the source 15 are directly passed on to the image on the screen 19. The spatial illumination pattern at the imager gate 18 is directly superimposed on the pixilated panel, which in turn is accurately imaged onto the screen 19. If one part of the source 15 is brighter than another, then one part of the imager gate 18 receives more illumination than another, and likewise one part of the image on the screen 19 appears brighter than another. For example, if the source 15 is an LED die or an LED array, in which a generally bright emission field having an appropriate outer shape has specific (and generally unavoidable) dark regions corresponding to opaque bonding pads, wiring locations, gaps between adjacent dies, and/or other die features, then the dark regions are clearly visible in the projected image on the screen 19.

Additional homogenizer components, such as diffusers, lens arrays, tunnel-shaped light guides, and the like, can be introduced into the optical path prior to the imager gate 18 to improve uniformity at the imager gate, but such components can be disadvantageous to the extent they negatively impact the size, complexity, expense, or efficiency of the projector.

Accordingly, we describe herein projection systems in which a relationship between the condenser subsystem and the projection subsystem is satisfied that permits substantial homogenization of the beam (i.e., blending of the bright and dark regions of the source to enhance illumination uniformity across the selected non-circular outer shape of the imager gate) without wasting a significant amount of power (such as occurs when illuminating a rectangular imager gate with an oversized circular beam), and without the need for additional homogenizer components in the optical path between the source and the imager gate.

Figure 3:
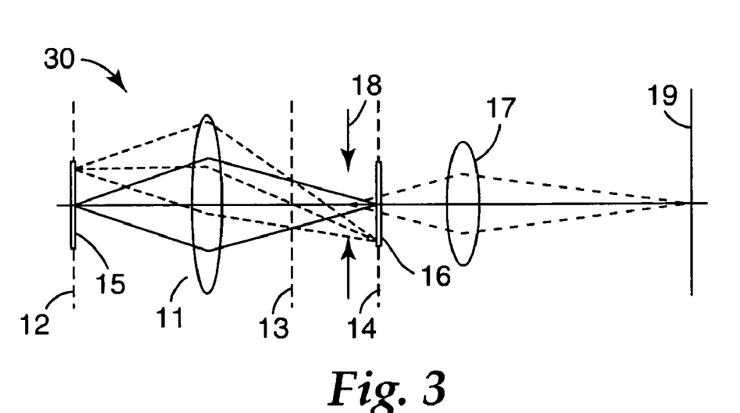
FIG. 3 is a schematic drawing of an illumination system with essentially no field curvature.

FIG. 3 shows an optical system 30 that homogenizes the illuminating beam without wasting a significant amount of optical power, and includes no more optical components than the systems shown in FIGS. 1 and 2. Here, the imager gate 18 is axially displaced away from the image of the source 16 toward the condenser back focal plane 13.

By locating the imager gate 18 close to, but separated from, the image of the source 16 (or the condenser image plane 14), two effects occur: (1) the area of illumination at the imager gate 18 is roughly the same size and has the same outer shape as the image of the source 16, and (2) the bright and dark regions present at the source 12, which are reproduced clearly at the condenser image plane 14, become blurred together at the imager gate 18. Both of these effects are explained further below.

First, in order to quantify the size of the illuminated area, we derive some estimates of beam size at various axial locations, based on paraxial approximations. For a source 15 with a full spatial extent (along a particular dimension, such as a length or width of a rectangular area) of $2H_{source}$, and a condenser 11 magnification denoted by M, the spatial extent of the image of the source 16 is $2MH_{source}$. If we assume that the source 15 emits into a symmetrical cone, where the cone is represented as a paraxial angle having a full-angle of $2NA_{source}$, and where NA denotes numerical aperture, then, after the condenser, the (converging) cone has a full-angle of $2NA_{incident}=2NA_{source}/M$, where the "incident" subscript denotes the cone incident on the imager gate 18. We denote X as the axial distance between the condenser back focal plane 13 and the condenser image plane 14, and note that the spatial extent of each illuminating beam at the condenser back focal plane 13 is $(2NA_{incident})X=(2NA_{source}/M)X$.

As a rough guide to ensuring that the illumination size at the imager gate 18 is proper, we preferably force the spatial extent of the beam at the condenser back focal plane 13 to be the same size as the image of the source 16, where both should approximately equal the size of the imager gate. Pictorially, with respect to FIG. 3, this ensures that the lowermost dotted ray between elements 13 and 14 is essentially horizontal, even though it is drawn in FIG. 3 as descending slightly from left to right. As a result, all the rays emergent from the source 15 would be constrained to lie between this lowermost dotted ray and a corresponding uppermost dotted ray (not shown), both of which would be essentially parallel to the optical axis. The mathematics of this are shown in the following paragraph.

The full size of the image of the source 16 is $2MH_{source}$. The full size of the beam at the condenser back focal plane 13 is $(2NA_{source}/M)X$. We set these two quantities equal to each other, and note that they may both approximately equal the full size of the imager gate, denoted by $2H_{imager\ gate}$:

$$2MH_{source}=(2NA_{source}/M)X \qquad (1)$$

Because the size of the imager gate 18, $2H_{imager\ gate}$, is most likely fixed by the size of the pixilated panel (such as a rectangular LCOS panel), and the beam divergence $2NA_{source}$ emerging from a source such as an LED die is most likely fixed by the manufacturer of the source, and X may be constrained by a design requirement, such as a volume envelope having a particular dimension or a particular minimum dimension, we solve for the condenser magnification M and for the size of the source $2H_{source}$:

$$M = NA_{source} X/H_{imager\ gate} \quad (2)$$

$$H_{source} = H_{imager\ gate}/M \quad (3)$$

Note that the mathematical analysis of the preceding paragraph is merely exemplary, and is intended as a rough guide for estimation, not a firm requirement of any optical system. The optical system 30 can function adequately even if the above equations or conditions are not satisfied. Any spatial extents cited may be measured along any particular lateral dimension, including the shortest dimension, the longest dimension, a diagonal dimension, or any other suitable dimension. In addition, the analysis above assumes that the source 15 and imager gate 18 are round, rather than rectangular; in reality, for a rectangular source, the beam profile evolves from circular at the condenser back focal plane 13 to rectangular at the condenser image plane 14.

Note also that if the emission from the source is asymmetric, the Kohler illumination area is typically also asymmetric. In some cases, it may be desirable to align the major and minor axes of the Kohler illumination with the long and short dimensions of a rectangular pixilated panel. Optionally, additional anamorphic optical elements may be used to alter the aspect ratio of the beam, preferably to match the illuminated area size and shape to that of the pixilated panel, ensuring that the pixilated panel is neither overfilled nor underfilled. Exemplary anamorphic elements include one or more cylindrical lenses, which affect the beam collimation along one particular dimension, but not the orthogonal dimension. Cylindrical lenses may be used in pairs, or may be used singly. A further example is an anamorphic prism, which can compress or expand the beam along one dimension but not along the perpendicular dimension. Anamorphic prisms may be used singly, or may be used in pairs. Any of these optional anamorphic optical elements may be located anywhere in the optical path between the source and the pixilated panel. Furthermore, the optional anamorphic element may be a discrete optical component, such as a cylindrical lens or a prism, or may be incorporated into one or more existing components along the optical path.

A second effect cited above is that the bright and dark regions present at the source 12 become blurred together at the imager gate 18. This blurring effect is analogous to the blur one sees from defocus. One may think of this as "propagating backwards" from an image of the source, with the expected defocusing effects. In this case, the imager gate 18 is axially separated from the image of the source 16, with a separation large enough to adequately blend the bright and dark regions present at the source 15. Note that a real image need not be actually formed in the system; since the pixilated panel may be located between the source and the image of the source, light propagating along the optical axis interacts with the pixilated panel before forming a real image. This image of the source 16 may be considered a virtual image.

In FIG. 3, the condenser 11 has an essentially flat field, or essentially zero field curvature. In other words, the image of a planar object is also planar. Therefore, the image of the source 16 is essentially flat, and the defocusing effects in "propagating backwards" to the imager gate 18 are substantially uniform over the area of the imager gate, affecting the center and edges of the illumination pattern equally.

Figure 4:
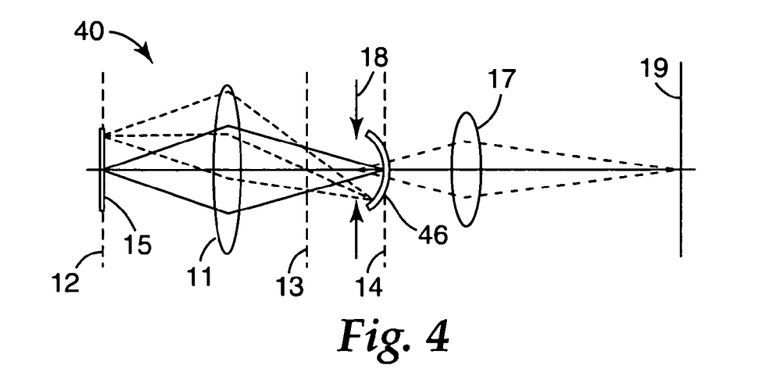
FIG. 4 is a schematic drawing of an illumination system with a substantial amount of field curvature.

In some cases, it may be desirable to blur some portions of the illumination pattern more than others. For instance, we may want a lot of blur in the center of the illumination region, and less blur at the edges, so that the edge of the illumination pattern still has some definition. This is possible in optical system 40. A condenser 41 has a significant amount of field curvature, with the edges of the field bent inward toward the condenser 41. Alternatively, the edges of the field may bend away from the condenser 41. The condenser 41 also has a condenser object plane 42, a condenser back focal plane 43 and a condenser image plane 44. A source 45 placed at the condenser object plane 42 now forms a curved image 46, with its center intersecting the optical axis at the condenser image plane 44.

The imager gate 18 is axially separated from the image of the source 46. At the center of the imager gate 18, there is more axial translation away from the image of the source 46 than at the edge, leading to more defocus-induced blurring at the center than at the edge.

One may understand the effects of high field curvature by envisioning the illuminating beam at various imagined observation planes in the optical system 40.

At the condenser image plane 44, the illuminating beam resembles the source 45, with the central portion of the beam imaged clearly and the edges blurred by the curvature of the field. At this plane, the central portion of the beam shows the bright and dark regions of the source without any blurring.

Moving axially toward the condenser 41 slightly, one finds that there exists a particular ring away from the center of the beam that is imaged clearly, with increasing blur both inside and outside the particular ring. The ring corresponds to the locus of points at which our observation plane intersects the curved image of the source 46. Along this ring, the bright and dark regions of the source are imaged clearly without any blurring.

Moving axially further toward the condenser 41, one finds that the clearly imaged ring moves outward away from the optical axis, with increasing blur both inside and outside the clearly imaged ring.

If one continues to move axially toward the condenser 41 until the observation plane just intersects the outermost portion of curved image of the source 46, one sees that the outermost edge of the illumination pattern shows the bright and dark detail of the source 45, with increasing blur inside the illumination pattern. Although in many cases it is desirable to have a sharp edge to an illumination pattern, it is often undesirable to have the bright and dark regions of the source imaged clearly at the edges of the illumination pattern. However, depending on the amount of field curvature and system requirements, such an illumination pattern may be acceptable in some embodiments.

Finally, if one moves axially even further toward the condenser 41, beyond the curved edge of the image of the source 46, one sees a slightly blurred edge to the illumination pattern, sufficient to reduce the contrast between bright and dark patches, but small enough so that the edge or periphery of the illumination pattern is still relatively well defined. This edge may be superimposed with the edge of the imager gate 18 during operation. In the interior of the illumination pattern, the blurring effect is much larger than at the edge, and the illumination pattern at the imager gate 18 is fairly well homogenized by the corresponding defocusing effects.

In FIGS. 1-4, the condensers 11 and 41 are drawn as having no appreciable spherical aberration. Optionally, the condensers may have a significant amount of spherical aberration, which can add to the desirable blurring effects in a manner similar to that of field curvature. Preferably, the condenser 41 may have a large amount of negative spherical aberration (meaning that rays at the edge of the illuminating beam cross the optical axis farther away from the condenser than rays near the center of the beam). Alternatively, the condenser 41 may have a large amount of positive spherical aberration, or any suitable amount of spherical aberration, including none.

Figure 5:
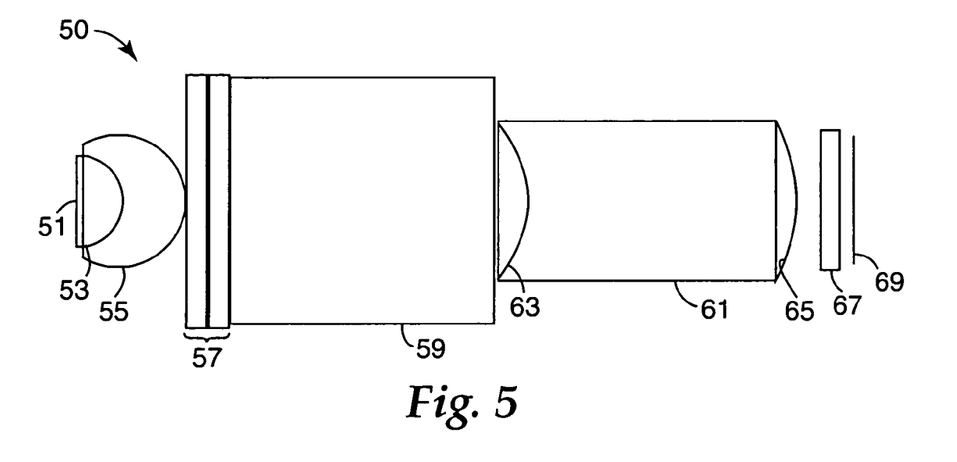
FIG. 5 is a plan drawing of one embodiment of an illumination system.

FIG. 5 shows one exemplary embodiment of an optical system 50 in which the pixilated panel is located similarly to that in FIG. 4, but is used in reflection. The embodiment of FIG. 5 is merely an example, and is not intended to be limiting in any way. Each component in the optical path is described in greater detail below.

The source 51 is an LED array, which preferably has a generally rectangular outer shape with an aspect ratio that matches that of the pixilated panel, such as 4:3 or 16:9. Alternatively, the LED array can have a different aspect ratio than that of the pixilated panel, and anamorphic optics (discussed above) can be used to shape the illumination beam to match the size of the pixilated panel. The LED array may have bright regions of emission, with dark regions that correspond to non-emitting structures, such as wires or electrical connections, or gaps between die or other support elements. A typical LED array may emit a luminous flux of about 20 lumens, although any suitable value may be used. Such an array may consume an electrical power of about one watt, which is much smaller than the required electrical power for a comparable arc lamp. Note that some LED arrays emit light in a fairly narrow range of wavelengths. For example, the LED array may emit in the blue region of the spectrum, so that when viewed by a human eye, its entire range of wavelengths appears to be essentially blue. Alternatively, the LED array may emit in the red, in the green, or in some other suitable portion of the spectrum. In some embodiments, white-light emitting LEDs (containing phosphors, or multiple dies emitting different colors) may be used.

Light from the source 51 is collected by a multi-element condenser, which in FIG. 5 is elements 53 through 67, collectively. Each of these is described below. This condenser is merely exemplary, and any suitable condenser may be used, having one or more refractive, reflective, and/or diffractive elements.

Light from the source enters a compound encapsulant lens. The lens can be a doublet as shown, having an inner lens 53 and an outer lens 55 in intimate contact with each other. Where the light source is an LED die array connected by wire bond(s), the inner lens 53 preferably encompasses the LED die array and wire bond(s) in a substantially plano-convex space, where the radius of curvature and axial position of the convex surface are selected to minimize the volume of the space, and therefore of the lens. Such lens 53 may be composed of a liquid or gel, or cured polymer material, and may have a refractive index of about 1.5. The outer lens 55 is preferably composed of a relatively high refractive index material, e.g., a glass whose refractive index is about 2 or more. Lens 55 also preferably has a meniscus shape, the outer surface of which can be designed to be substantially aplanatic, i.e., having little or no spherical aberration or coma, at least for a specified portion of the light source, such as an edge portion at the extreme lateral edge of the light source or an intermediate portion between the lateral edge and the optical axis. The inner surface of lens 55 mates with the outer surface of inner lens 53. The encapsulant lens is described more fully in commonly assigned U.S. application Ser. No. 11/322,801 entitled "LED With Compound Encapsulant Lens", filed on even date herewith, and incorporated herein by reference.

Following the encapsulant lens is a pair of Fresnel lenses 57. The first Fresnel lens may be selected to substantially collimate the beam. The incident face of the second Fresnel lens may have a polarizing film or element on it, such as a reflective polarizer that transmits one polarization and reflects the other. Exemplary reflective polarizers include coextruded multilayered films discussed in U.S. Pat. No. 5,882,774 (Jonza et al.) and cholesteric reflective polarizers. Exemplary methods of making coextruded multilayered polarizing films are disclosed in U.S. Patent Application Publications US 2002/0180107 A1 (Jackson et al.), US 2002/0190406 A1 (Merrill et al.), US 2004/0099992 A1 (Merrill et al.), and US 2004/0099993 A1 (Jackson et al.). Further exemplary reflective polarizers include Vikuiti™ dual brightness enhancement films (DBEF) available from 3M Company, St. Paul, Minn. Incorporating a polarizer on the second Fresnel lens, or otherwise mounting one between the Fresnel lenses or at another position close to the light source, provides a polarized light beam to optical elements downstream in the system, which may be useful as described further below. The second Fresnel lens converges the beam. If the magnification of the compound encapsulant lens is sufficiently high, the second Fresnel lens can be omitted. An exemplary Fresnel lens pair is described in commonly assigned U.S. patent application Ser. No. 11/322,981 titled "Fresnel Lens Combination", filed on even date herewith and incorporated herein by reference.

The beam then enters a beamsplitting color combiner 59, sometimes referred to as an X-cube color combiner, in which both hypotenuses in a particular dimension have color-sensitive coatings that can reflect one wavelength band and transmit another, the coatings usually being optimized for s-polarized light. (The color combiner is shown schematically in FIG. 5, and thus the hypotenuses are not shown.) The reader will understand that only one color channel is shown in FIG. 5 for simplicity, but for a full color projection system the optical system 50 will have two additional color channels, replicating elements 51, 53, 55, 57 for each color channel except that the source 51 emits red, green, or blue light respectively for a given channel. The resulting three color channels couple to different sides of the color combiner 59, forming a red arm, a green arm, and a blue arm, where each arm has its own source and lens components. The output from the color combiner has light from all three arms superimposed, and all three wavelength bands illuminate the pixilated panel along the same optical path (downstream of the color combiner). Preferably, the color combiner 59 transmits green wavelengths while reflecting blue and red, although other suitable configurations may be used.

Following the color combiner is a polarizing beam splitter 61, which has a broadband polarization-sensitive coating or element along its hypotenuse (not shown). The hypotenuse transmits one polarization state while reflecting the orthogonal polarization state. The polarizing beam splitter 61 can have flat outer faces or, as shown, can include integral focusing elements on its outer faces. In FIG. 5, a negative lens is formed on an incident face 63 and a positive lens is formed on an exiting face 65 of the beam splitter. These integral lenses may be spherical or aspheric, as desired, and they may be replaced with lenses manufactured separately and then attached to flat outer surfaces of the beam splitter. The lenses 63, 65 may be considered to be relay lenses. An exemplary polarizing beam splitter is disclosed in commonly assigned U.S. patent application Ser. No. 11/192,681 entitled "Method For Making Polarizing Beam Splitters", filed Jul. 29, 2005 and incorporated herein by reference. Note that integral lenses can also be used on the color combiner 59.

Polarized light from the red, green, or blue channel passes through the hypotenuse of the beam splitter 61 and is incident on the pixilated panel 69, whereupon light reflected from the panel with an orthogonal polarization state reflects off the hypotenuse and exits a side (such as the bottom-most face in FIG. 5) of the polarizing beam splitter 61, to be transmitted through a projection lens and projected on a screen.

Element 67 is a cover plate for the pixilated panel 69, which is preferably an LCOS panel. The active area of the pixilated panel 69, typically rectangular, coincides with the imager gate (not shown separately). LCOS panels operate in reflection, and on a pixel-by-pixel basis, rotate the plane of polarization of the reflected beam in response to a driving electrical signal. If a particular pixel has a low brightness, then the plane or polarization is rotated only a small amount. If the pixel has a high brightness, then the plane of polarization is rotated by close to ninety degrees. The LCOS may operate on all three wavelengths simultaneously, or may cycle through the colors once for each particular frame (field sequential or color sequential systems). For example, for a refresh rate of 60 Hz, with a full cycle time of (1/60) seconds, one possible cycling scheme energizes only the red LED (while turning off the green and blue LEDs) for (1/180) seconds, then energizes only the green LED for (1/180) seconds, then energizes only the blue LED for (1/180) seconds. This is merely an example, and other cycling methods may be employed as desired.

In the embodiment of FIG. 5, all the elements between the source 51 and the pixilated panel 69 may be considered the condenser. This collection of elements defines a condenser object plane (coincident with the source 51), a condenser image plane (not shown in FIG. 5 but usually disposed to the right of panel 69) and a condenser back focal plane (also not shown in FIG. 5 but usually disposed to the left of panel 69). As discussed above, the pixilated panel 69 is preferably located between the condenser back focal plane and the condenser image plane.

Regarding the location of the planes, there is a special case shown in FIG. 5 that is not addressed in FIGS. 1 through 4. LCOS panels operate most effectively for a limited range of incident angles, generally close to normal incidence. As a result, light incident on the panel 69 should preferably be nominally collimated, so that the range of incident angles arises largely from the finite spatial extent of the source 51. If we consider the condenser to include all the elements between the source 51 and the panel 69, and the output from this condenser is essentially collimated, then the source (and hence the condenser object plane) is located essentially at the condenser front focal plane, and the condenser image plane is located essentially infinitely far away. For this case, we assume that the condenser image plane is located distantly to the right in FIG. 5, so that the panel 69 is located between the condenser back focal plane (to the left of panel 69) and the distant condenser image plane (to the right of panel 69).

In another special case, the condenser is designed such that diverging light strikes the pixilated panel, rather than converging light (as in FIGS. 1-4) or collimated light (as in FIG. 5). For this case, the condenser image plane may be located to the left of the condenser back focal plane (using the left-to-right conventions of FIGS. 1-5), and the imager gate is located between these two planes and closer to the condenser image plane than to the condenser back focal plane.

Figure 6:
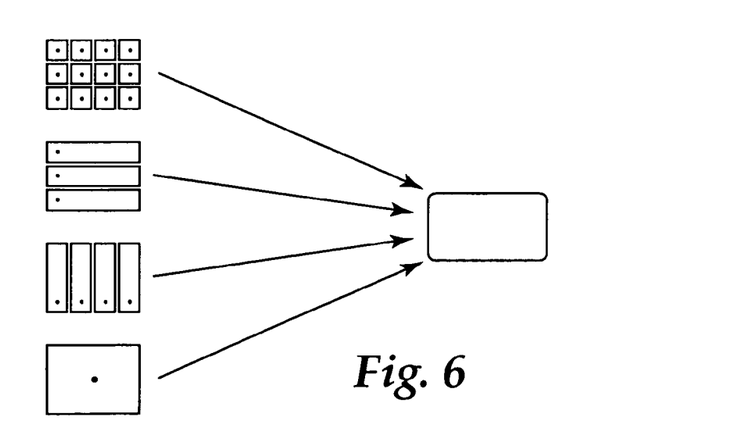
FIG. 6 is a schematic drawing showing the transformation of nonuniform extended sources into a uniformly illuminated beam.

FIG. 6 depicts several possible source configurations on the left hand side of the figure. Each represents an emission area, with dark regions caused by wire bonds, gaps between LED dies, or other structure. The rectangular area on the right side of the figure represents the uniform illumination at the imager gate achieved by the aforemention optical systems.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention. All patents and patent applications referred to herein are incorporated by reference in their entireties, except to the extent they may be contradictory to the present specification.

The invention claimed is:

1. A projection system, comprising:
    a condenser having a condenser object plane, a condenser image plane, and a condenser back focal plane; and
    an imager gate disposed between and spaced away from the condenser back focal plane and the condenser image plane.

2. The system of claim 1, wherein the imager gate is closer to the condenser image plane than to the condenser back focal plane.

3. The system of claim 1, further comprising:
    a projection lens having a projection object plane and a projection image plane;
    wherein the imager gate is disposed in the projection object plane.

4. The optical system of claim 1, further comprising a source located generally at the condenser object plane.

5. The system of claim 4, wherein the condenser forms a curved image of the source; and
    wherein the imager gate is disposed away from and between the condenser back focal plane and the curved image.

6. The system of claim 5, wherein the field of the condenser is curved inward.

7. The system of claim 6, wherein the imager gate is closer to the curved image than to the condenser back focal plane.

8. The system of claim 1, wherein the condenser has a non-zero amount of spherical aberration.

9. The system of claim 4, wherein the source has an extended outer shape, and emits light non-uniformly across the outer shape.

10. The system of claim 9, wherein the source has distinct emitting and non-emitting regions bounded by the outer shape, the emitting regions including at least one LED die.

11. The optical system of claim 10, wherein the distinct emitting regions correspond to an array of LED dies, and the outer shape is substantially rectangular.

12. The system of claim 9, wherein the outer shape is rectangular.

13. The system of claim 1, further comprising a pixilated panel disposed at the imager gate.

14. The system of claim 13, wherein the pixilated panel is reflective.

15. The system of claim 14, wherein the pixilated panel includes a liquid crystal on silicon (LOCS) panel.

16. A method of modulating a beam of light, comprising:
    providing an extended source;

focusing light from the source into a beam with a condenser onto an image plane of the condenser, the condenser further having a back focal plane; and forming an image by spatially modulating the beam at an imager gate disposed between the condenser image plane and the condenser back focal plane.

17. The method of claim 16, wherein the extended source has a source outer shape and the imager gate has an imager shape congruent to the source outer shape.

18. The method of claim 16, wherein the source outer shape and the imager shape are rectangles having different aspect ratios, and the condenser includes at least one anamorphic element.

19. The method of claim 16, wherein the forming step includes adjustably controlling polarization of individual portions of the beam at the imager gate.

20. The method of claim 16, further comprising:
projecting the image onto a screen with a projection lens.

21. A projection system, comprising:
a condenser lens having a condenser object plane, a condenser image plane and a condenser back focal plane; and a projection lens having a projection object plane and a projection image plane;

wherein the projection object plane is between and spaced away from the condenser back focal plane and the condenser image plane.

22. The system of claim 21, wherein the projection object plane is closer to the condenser image plane than to the condenser back focal plane.

* * * * *

UNITED STATES PATENT AND TRADEMARK OFFICE
CERTIFICATE OF CORRECTION

PATENT NO. : 7,369,320 B2 Page 1 of 1
APPLICATION NO. : 11/322958
DATED : May 6, 2008
INVENTOR(S) : Patrick R. Destain It is certified that error appears in the above-identified patent and that said Letters Patent is hereby corrected as shown below:

Title Page
Item [56], Pg.2 References Cited, OTHER PUBLICATIONS, under "Bruzzone et al." Delete "Catesian" and insert -- Cartesian --, therefor.

Column 2
Line 51, Delete "111" and insert -- 11 --, therefor.

Column 9
Line 64, After "Lens"" insert -- (Attorney Docket No. 61677US002) --.

Column 10
Line 24, After "Combination"" insert -- (Attorney Docket No. 61118US002) --.
Line 64, After "Splitters"" insert -- (Attorney Docket No. 61014US002) --.

Signed and Sealed this

Twenty-sixth Day of August, 2008

JON W. DUDAS
*Director of the United States Patent and Trademark Office*